Figure 1:
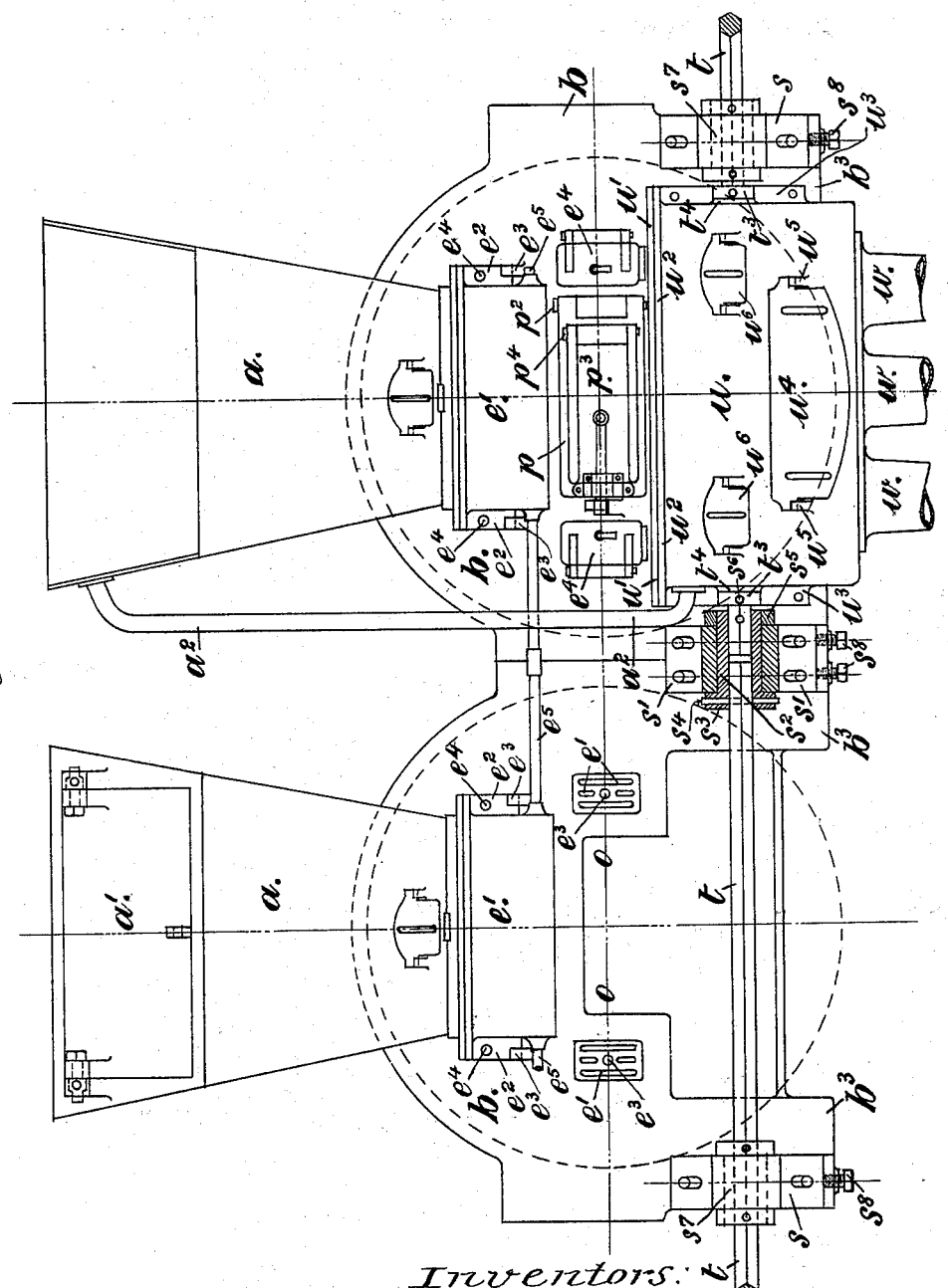

No. 609,038. Patented Aug. 16, 1898.
J. J., T. F. & J. W. MELDRUM & F. CLAYTON.
MECHANICAL STOKER.
(Application filed Feb. 23, 1898.)
(No Model.) 8 Sheets—Sheet 3.

Witnesses.
E. B. Bolton

Inventors:
James Jones Meldrum
Thomas Frederick Meldrum
John Wesley Meldrum
Fred Clayton
By Richards & Co
their Attorneys.

THE NORRIS PETERS CO., PHOTO-LITHO., WASHINGTON, D. C.

No. 609,038. Patented Aug. 16, 1898.
J. J., T. F. & J. W. MELDRUM & F. CLAYTON.
MECHANICAL STOKER.
(Application filed Feb. 23, 1898.)
(No Model.) 8 Sheets—Sheet 4.
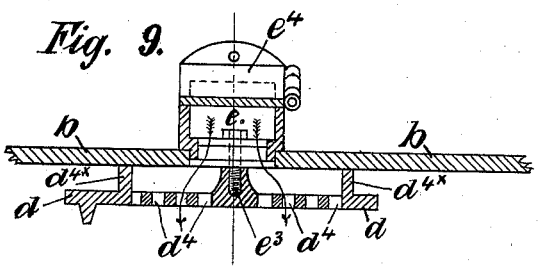
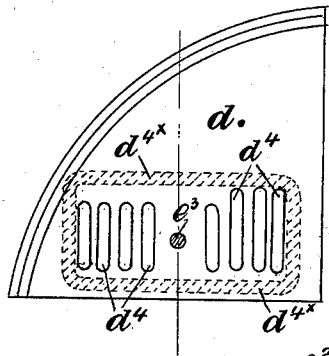
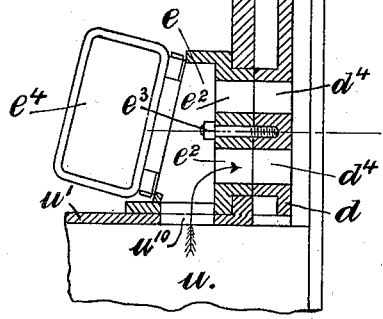
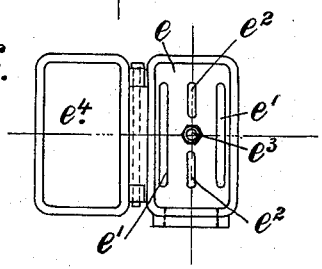
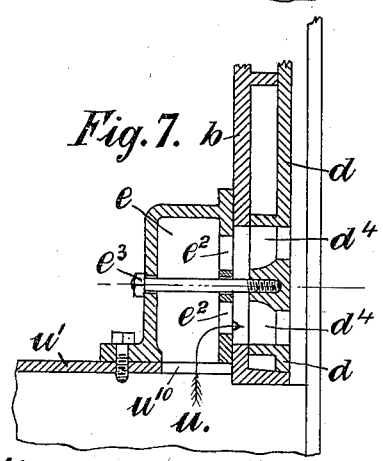
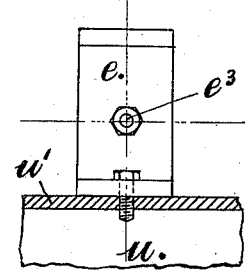
Witnesses.
E. B. Bolton
Inventors:
James Jones Meldrum
Thomas Frederick Meldrum
John Wesley Meldrum
Fred Clayton
By Richards & Co
their Attorneys.
THE NORRIS PETERS CO., PHOTO-LITHO., WASHINGTON, D. C.

No. 609,038. Patented Aug. 16, 1898.
J. J., T. F. & J. W. MELDRUM & F. CLAYTON.
MECHANICAL STOKER.
(Application filed Feb. 23, 1898.)
(No Model.) 8 Sheets—Sheet 5.
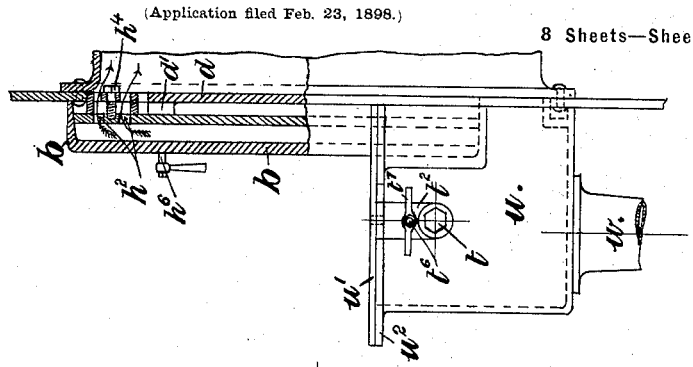
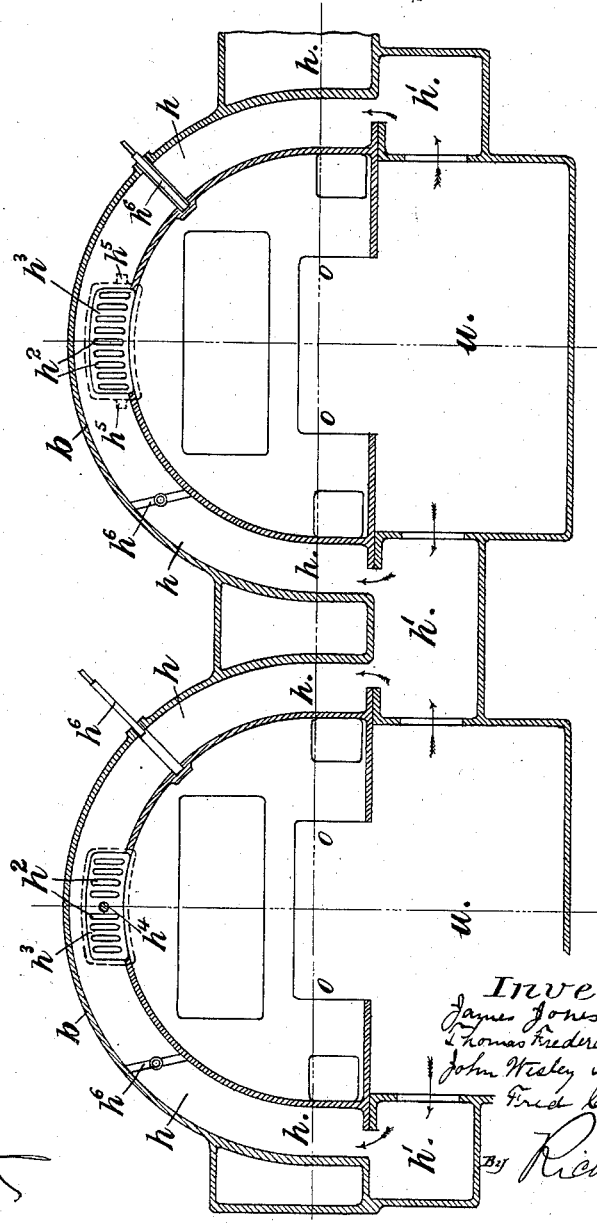
Witnesses.
Inventors:
James Jones Meldrum
Thomas Frederick Meldrum
John Wesley Meldrum
Fred Clayton
By Richards & Co
their Attorneys.
THE NORRIS PETERS CO., PHOTO-LITHO., WASHINGTON, D. C.

No. 609,038.  
J. J., T. F. & J. W. MELDRUM & F. CLAYTON.  
MECHANICAL STOKER.  
(Application filed Feb. 23, 1898.)

Patented Aug. 16, 1898.

(No Model.)

8 Sheets—Sheet 6.

Witnesses.  
E. B. Botton

Inventors:  
James Jones Meldrum  
Thomas Frederick Meldrum  
John Wesley Meldrum  
Fred Clayton  
By Richards & Co  
their Attorneys No. 609,038. Patented Aug. 16, 1898.
J. J., T. F. & J. W. MELDRUM & F. CLAYTON.
MECHANICAL STOKER.
(Application filed Feb. 23, 1898.)
(No Model.) 8 Sheets—Sheet 7.

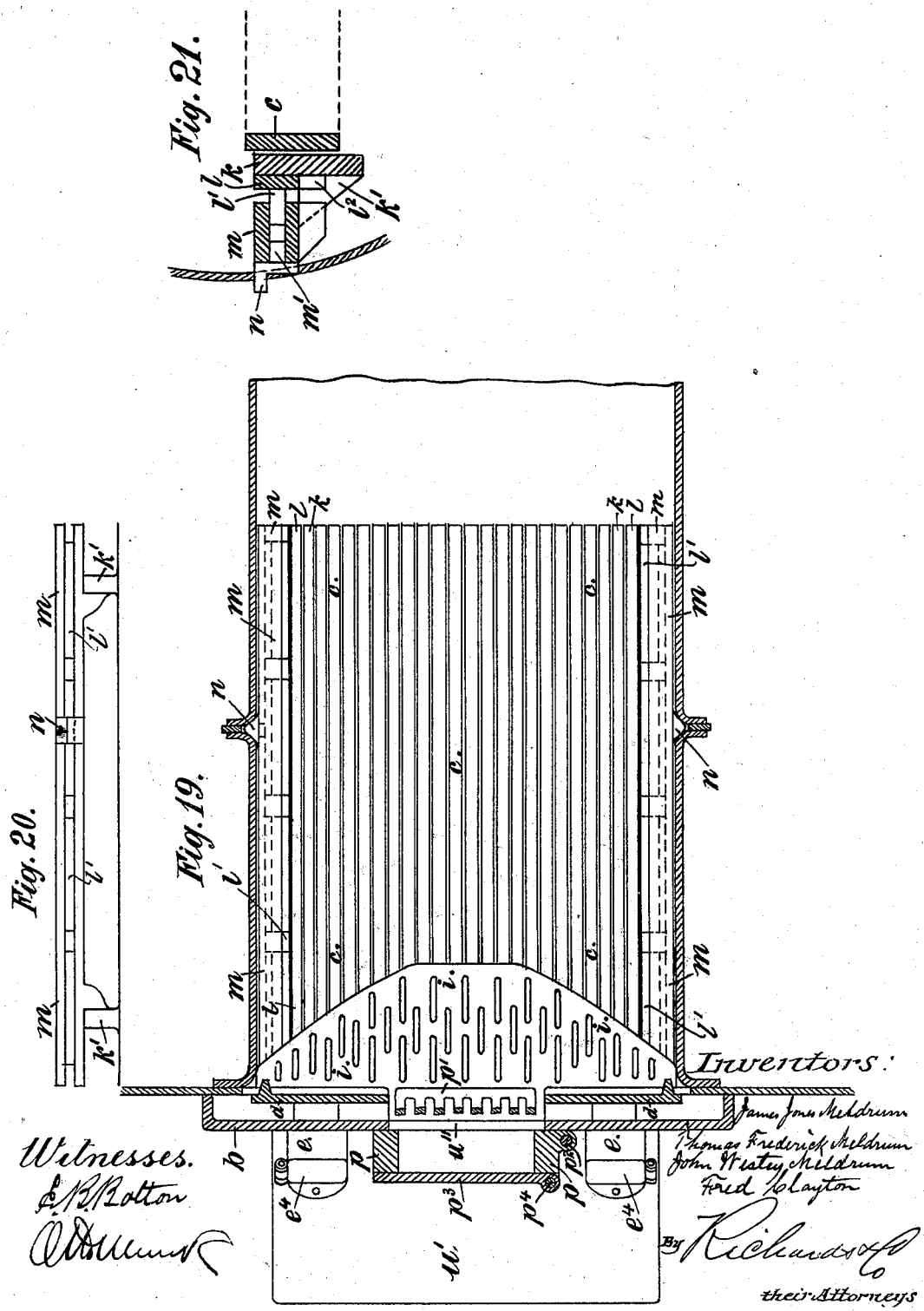

United States Patent Office.

JAMES JONES MELDRUM, THOMAS FREDERICK MELDRUM, JOHN WESLEY MELDRUM, AND FRED CLAYTON, OF MANCHESTER, ENGLAND.

MECHANICAL STOKER.

SPECIFICATION forming part of Letters Patent No. 609,038, dated August 16, 1898.

Application filed February 23, 1898. Serial No. 671,333. (No model.)

*To all whom it may concern:*

Be it known that we, JAMES JONES MELDRUM, THOMAS FREDERICK MELDRUM, JOHN WESLEY MELDRUM, and FRED CLAYTON, subjects of the Queen of Great Britain, and residents of Manchester, in the county of Lancaster, England, have invented certain new and useful Improvements in Mechanical Stokers, of which the following is a specification, this invention having been patented in England under date of July 26, 1897, No. 17,493.

This invention has reference to mechanical stokers—that is, to apparatus and means for feeding solid fuel to and burning it in furnaces of steam-generators and other plants or apparatus in which fuel is similarly burned; and the invention has for its object, primarily, to provide a mechanical stoking apparatus wherein the air used in the combustion of the fuel is artificially supplied—that is, forced through the fuel—which shall be advantageous and effective and of a simple construction and offering substantially no practical objectionable features; also, to provide certain specific improvements, hereinafter described, in mechanical coking-stokers and generally to improve the construction of mechanical coking-stokers at various points and parts and the mode of effecting and carrying on the actions of combustion.

The invention will be chiefly described in connection with and by the aid of the drawings accompanying the specification, which show generally a mechanical stoking apparatus applied to a twin or double circular furnace of the coking type; but it is to be understood the certain novel characteristics of the several combinations or constructions hereinafter described where applicable can be used in connection with "sprinkler" or other kinds or types of mechanical stokers.

Figure 2:
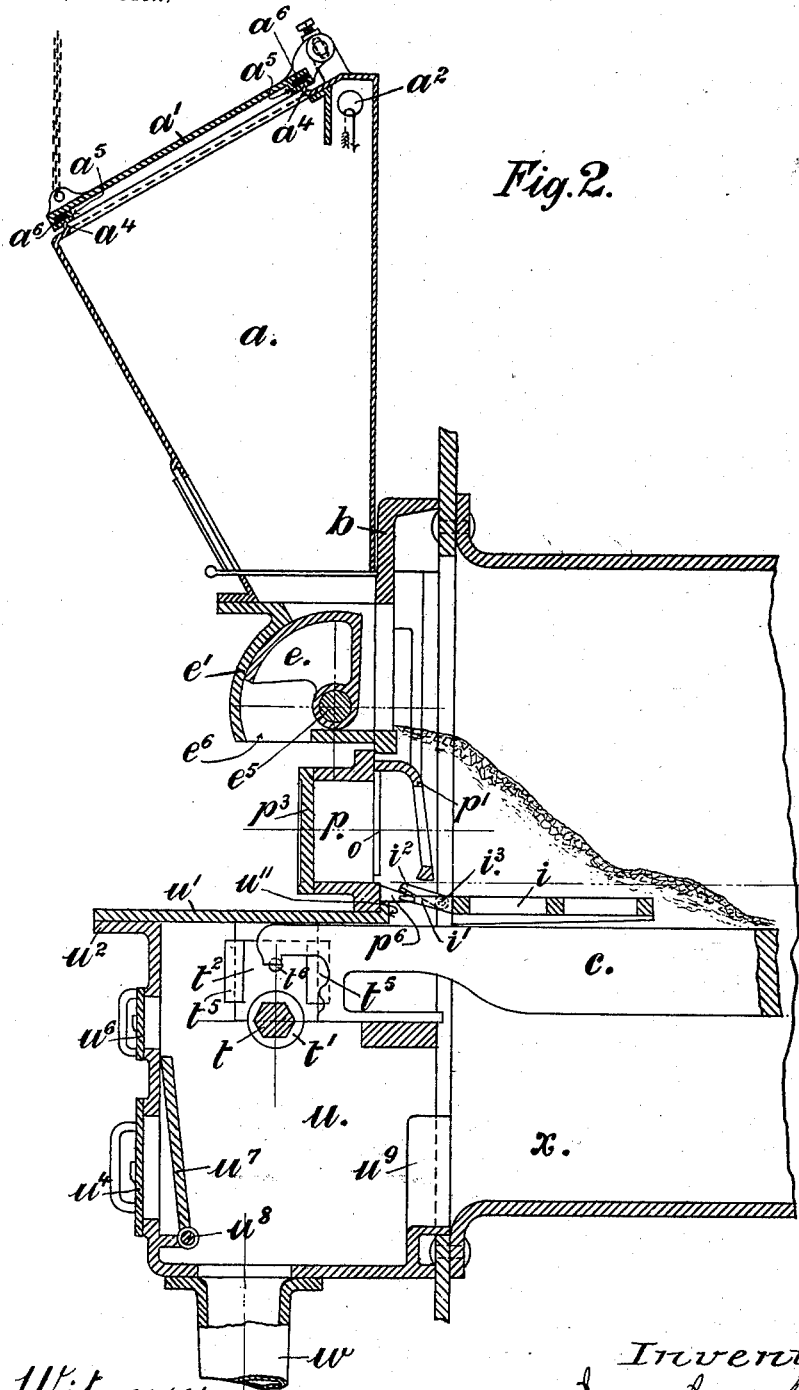
Figure 3:
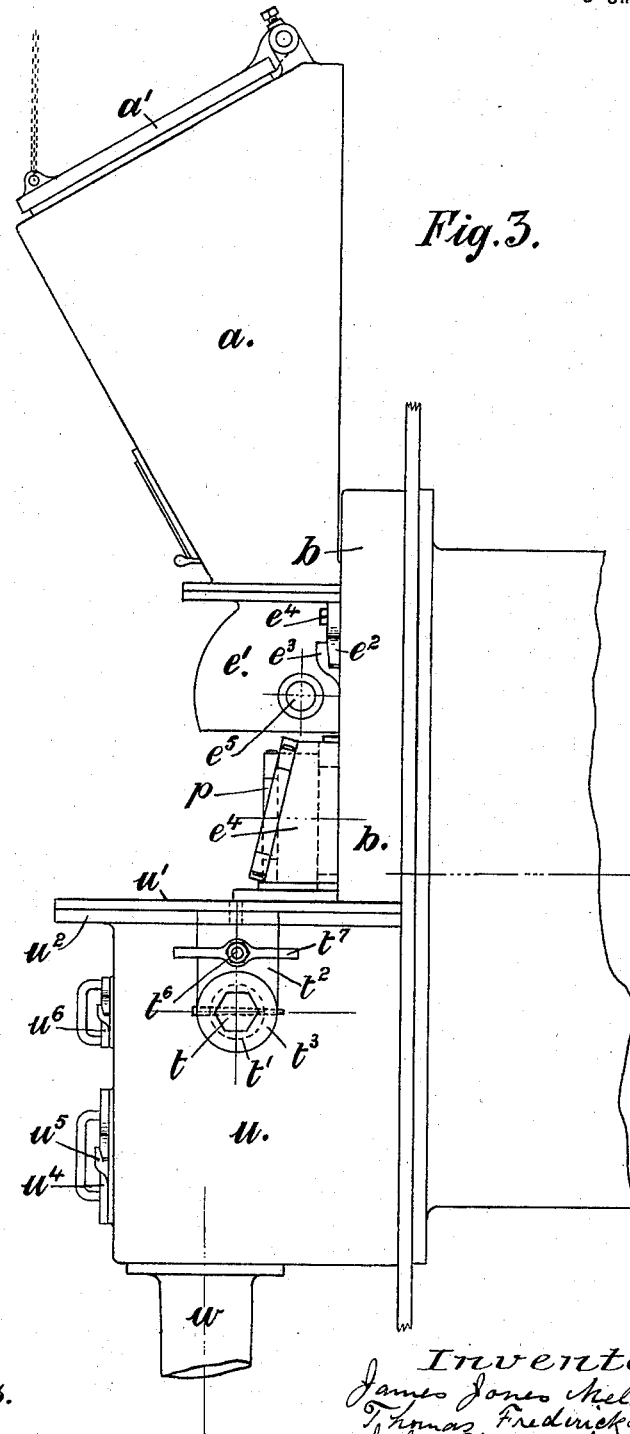
Figure 13:
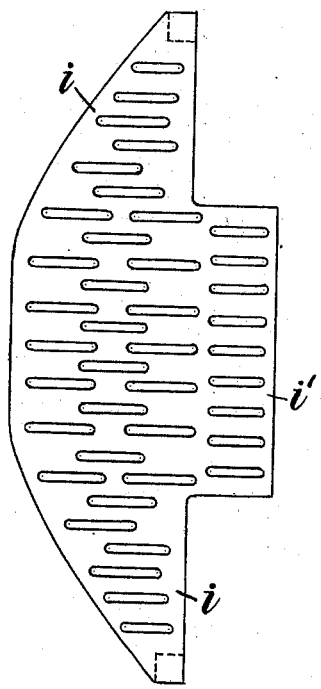
Figure 14:
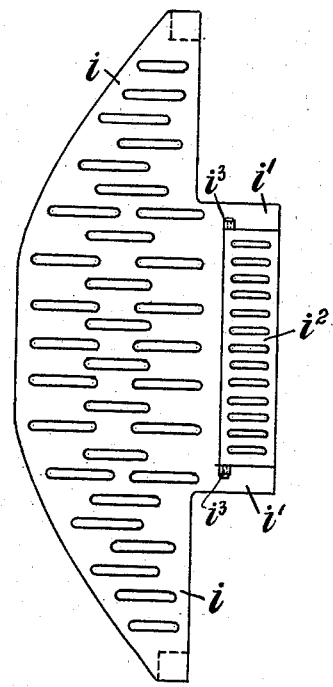
Figure 15:
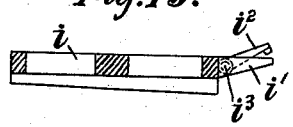
Figure 16:
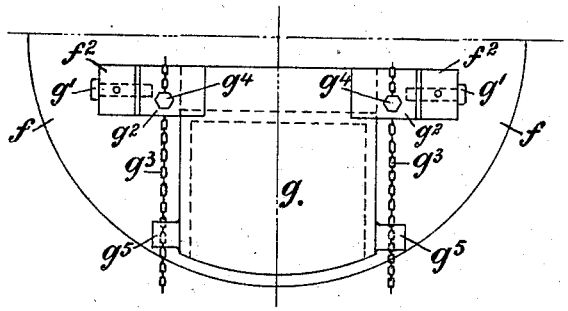
Figure 17:
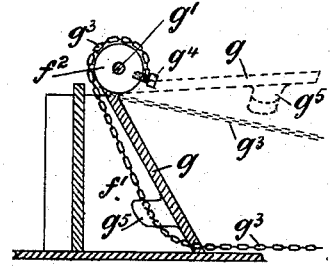
Figure 18:
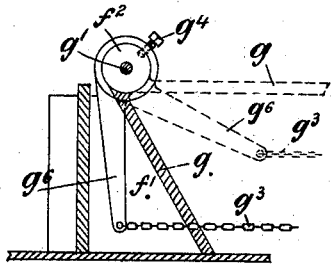

In the drawings, Figure 1 shows a stoker according to this invention, in outside elevation, applied to two circular furnaces, say, of a double steam-generator, with the outer parts on one side removed. Fig. 2 is a longitudinal sectional elevation showing the apparatus, and Fig. 3 is an outside elevation of same. Fig. 4 is a section showing a detail taken at the line A A, Fig. 2. Figs. 5 and 6 are a sectional elevation and end view of side supplemental air-supply devices, hereinafter described; and Figs. 7, 8, 9, and 10 are respectively a sectional elevation and outside view and a sectional plan and inside view showing modifications of this air-supply device. Fig. 11 is a sectional elevation taken at B B, Fig. 12; and Fig. 12 is an outside elevation, partly in section, showing a further modification connected with the supply of air to the furnace above the fuel. Fig. 13 shows a coking-plate according to this invention; and Figs. 14 and 15 are a plan and cross-section, respectively, showing a modification of coking-plate. Figs. 16 and 17 are an end view and elevation showing the construction connected with the end of the ash-pit below the grate-bars, and Fig. 18 shows in elevation a modification of same. Figs. 19, 20, and 21 are a plan, sectional elevation, and cross-section, respectively, showing the construction and arrangement of parts connected with the grate.

The complete mechanical stoker or apparatus as applied to a steam-generator comprises the following main characteristics or parts in combination, namely: a hopper $a$ at the upper part for receiving and holding the fuel—such as small coal, coke, or anthracite—and from which it (the fuel) is supplied to the furnace. Directly under this hopper is the positive feeding plunger or ram $e$, horizontally arranged and vibrating forward or backward about a center. Then below this are the coking parts, doors for gaining access to the fuel at the front, and supplemental side air-supply devices—namely, a coking-plate $i$, main doorway $o$ and door $p$, and side air-supply devices $e$. Then below these again comes an air chest or box $u$, inclosing the front of the ash-pit $x$ and also the fire-bar ends and mechanism for operating them, while, again, on the under side of these boxes $u$ are inverted steam-jet blowers $w$, their discharge mouths or ends being connected to the bottom plate of the box.

By the blowers $w$ air is supplied to the box $u$ and the ash-pit $x$ of the furnace and is maintained therein at a pressure above that of the atmosphere, and from this box air is supplied to the back of the fuel resting on the coking-plate $i$ and also to the space above the fuel in the hopper $a$. The air supplied to the back of the fuel on the coking-plate $i$ is for the purpose of assisting the combustion of fuel and a rapid coking action and that supplied to the hopper $a$ above the fuel for obviating the burning back of the fuel from the furnace up into the hopper. Generally speaking, the above parts specify all the main characteristics concerned under the invention connected with the supply of air.

The apparatus shown is of duplex kind, arranged and adapted for use in connection with a double-furnace steam-generator or other apparatus to be heated, the parts being in duplicate and arranged side by side, as shown, and these parts are carried by main frames or plates $b$, attached to the front plate of the steam-generator or other application in connection with which the apparatus is used.

First, with regard to the means and parts for supplying the air under pressure to the ash-pits and furnaces and the construction of the parts at the front of the apparatus the box $u$, to which air is supplied by the blowers $w$, is provided with a lid or cover $u'$, which is fastened by bolts to the external flange $u^2$, extending all around the top edge of the box $u$, the box itself being secured to the front plate or frame $b$ by flanges $u^3$. Of course the part of the box which comes next the ash-pit $x$ of the furnace is open to the ash-pit, while in the front of the box, opposite the ash-pit, there is a detachable hand-door $u^4$, supported by lugs $u^5$ at each side, by which when it is removed direct access to the ash-pit through the box $u$ is obtained, and at a higher level, in the front of the box, similar hand-doors $u^6$ are provided, by which access to the cam-shaft and cams for working the bars can be had for inspection, lubricating, and other purposes when required.

The inverted blowers $w$ are of the steam-jet type and are secured by their discharge-mouths to the bottom plate of the box $u$, while their heads pass through the ordinary foot-plate below, from which the furnaces are worked and are inclosed in a box or chamber below it. By this arrangement and construction the noise created by jet-blowers is restricted to the chamber in which their heads are placed and inclosed and is rendered unobjectionable to those outside. In connection with these blowers within the box $u$ there is a flap-door $u^7$, hinged at $u^8$, which is adapted to fold down and cover the mouths of the blowers $w$ when the door $u^4$ is off and ashes, &c., are being withdrawn from the ash-pit, thereby preventing such ashes, &c., falling down the blowers. Also on the lower part of the box, in cases where the invention is applied to the furnaces of internally-fired steam-generators, there is an angle-plate $u^9$, which fits over the edge of the front plate $y$ of the steam-generator at the bottom of the ash-pit, thereby preventing the access of water or moisture from the ash-pit to the front plate, so preserving the riveting and plate against corrosion which might otherwise happen.

The shaft which carries the cams for working the fire-bars passes through the box $u$ and is designated $t$. This shaft is hexagonal in section, and where it passes through the sides of this box $u$ the sides are gapped from the flange downward, and the shaft is provided with a sleeve $t'$, circular on the outside. This sleeve works partly in a half-bearing formed by the bottom of the gap and partly—viz., at the upper half—in a half-bearing formed by the lower end of the plate $t^2$, which fills this gap, while outside these parts there is a collar $t^3$, larger in diameter than $t'$, fixed on the shaft $t$, which is adjusted up to the outside edges of the bosses $t^4$, formed on the bearing parts, in which the sleeve $t'$ works. By these means an air-tight joint between this bearing and the shaft and parts carried by it is made. The filling-plate $t^2$ is held in position by a flange at its upper edge, which is bolted to the cover $u'$, with which it makes an air-tight joint, while at its sides it is provided internally with vertical flanges $t^5$, which bear upon the inner surfaces of the side plates of the box $u$, up to which they are drawn by a stud-bolt and nut $t^6$, placed in $t^2$ and passing through a bridge-bar $t^7$, the ends of which rest upon the sides of the box $u$ outside. The lid of the box is provided at each side with openings at $u^{10}$, and projecting inward of the inner edge of this cover and also above the surface thereof is a rib or ledge $u^{11}$, which works in connection with the door-opening $o$ in the frame-plate $h$, as hereinafter described.

Referring now to the fuel-feeding means and parts connected with the combustion of fuel, the fuel is contained in the closed and air-tight hopper $a$, which has a close-fitting door $a'$ on the upper part, and the upper part of which, above the fuel in it, communicates with the air-box $u$ by a pipe $a^2$. By this arrangement the direction of movement of air in the hopper and through the fuel will be toward the opening through which the fuel passes into the furnace and all tendency of burning back of the fuel up into the hopper $a$ owing to the use of forced or plus pressure draft employed is obviated. In the case shown the air is conducted to the upper corner of the hopper by a simple external pipe; but it may be carried up by a special passage cast or formed in the frame $b$ at the back of the hopper $a$, and a guard $a^3$ may be used about or in front of the entrance of the pipe $a^2$ into the hopper to prevent the fuel entering it. The air-tight joint between the hopper $a$ and its door $a'$ is effected by a rib $a^4$ on $a$ and a channel formed by flanges $a^5$ all around the edge of the lid $a'$ and having an asbestos, india-rubber, or other suitable strip $a^6$ within it, which when the door is closed comes upon the edge of the flange $a^4$ and makes an air-tight joint with it, or the door and seat may be faced. To adjust the door properly, the door-hinges at each side should be adjustable vertically.

The feeding ram or plunger $e$ is disposed directly under the open bottom of the hopper $a$ and is arranged and works in a casing $e'$, attached to the frame $b$. The hopper rests on the upper part of the casing $e'$, and the casing itself is secured to $b$ by means of wedge-shaped lugs $e^2$, formed upon it at each side and fitting into corresponding inclined catches $e^3$, formed on $b$. A further support and attachment of the case to the plate $b$ is effected by screw-studs $e^4$, which pass through the upper part of the lugs $e^2$ and screw into $b$. By this construction and mode of attachment the whole fuel-feeding device and the hopper can readily be removed and replaced in position when desired. The plunger or ram $e$ is mounted on a shaft $e^5$, passing through the lower part of the casing $e'$ and supported in the end plates thereof. The casing $e'$ is open at $e^6$ to allow of any fuel that may get behind it to escape. The front of the ram, however, next the furnace fills the casing between the bottom plate and the upper part. The ram $e$ is vibrated by suitable gearing through the shaft $e^5$, and at the backward vibration or swing fuel falls down in front of it from the hopper, and then when it moves forward it presses the fuel forward through the opening $b'$ in the plate $b$ onto the coking-plate $i$, hereinafter described. This opening $b'$ is practically of the full depth of the plunger. The front of the casing $e'$ is also open for the full depth of the plunger. On either side of this opening the detachable shield-plates, hereinafter described, are disposed.

Within the frame-plate $b$ and in front of the door-opening $o$ there is a gridded shield $p'$. This shield is formed on or attached to the inside of the door $p$, and the slots in it are vertically arranged. This shield, as shown, extends inward of the furnace and in an inclined direction downward and is open below. Through this open part air from the box $u$ is admitted to the space within it, and this air passes through the slots in the shield and fuel resting in front of it and assists in the combustion of the fresh fuel and effects a rapid coking of it. The shield also protects the door $p$ by keeping the fuel off it and guides the fuel onto the coking-plate $i$ below.

The door $p$ is of special construction, as shown in the drawings—that is to say, there are two doors—a main door $p$, which consists really of a hollow core or frame hinged at $p^2$ to the plate $b$, and a secondary door $p^3$, hinged at $p^4$ on the door $p^2$, the shield or grid $p'$ being formed on or connected to the inside of the main door $p$. The main door $p$ has an ordinary latch-fastening to engage with a catch on the plate $b$ and the secondary door $p^3$ has a latch engaging with a catch on the door $p$. The inner face of the door $p$ closes the opening $o$ all around. The edge of this opening, which constitutes a seat against which the inner edge of the door comes, is the edge of the plate $b$ at the sides and top of the opening $o$, while the lower part of the opening is formed by the inwardly-projecting rib $u^{11}$ on the cover $u'$ of the box $u$, which exactly fits in the space across the bottom of the opening $o$ and fills it. The plate $b$, as shown, does not extend down below the opening $o$ and the bottom of the cover $u'$, except at each side, where it is carried down in the form of horns $b^3$, which carry the brackets or bearing for supporting the cam-shaft $t$. The face of the door $p$, which comes up against the seat constituted by the edge of the plate $b$ around the space $o$ and the rib $u^{11}$, may be tooled, as may also the seat, to effect an air-tight joint. The effect of this construction is that by means of the door $p^3$ the fire in front resting upon the coking-plate $i$ can be seen by opening it without disturbing the fire, while by opening the main door $p$ access to the space above the coking-plate and fire-bars and the fire on them can be had and the fire worked and other operations performed, while at the same time by the space behind $p'$ and the hollow door $p$ the temperature of this door is kept at such a point as will prevent it or the plate $b$ being damaged by the fire. In some cases the hollow door will have a permanent back plate instead of the door $p^3$.

In the modification shown in Figs. 11 and 12 a construction is shown by which air from the box $u$ is conducted to the upper part of the furnace-front and admitted to the furnace above the fuel. The modified construction consists in providing or forming in the front frame-plate $b$, outside the other openings specified for air and fuel introduction, a conduit $h$, communicating with the box $u$ by means of chambers $h'$ on each side of the box $u$. At the upper part of the conduit $h$ and nearly on a level with the crown of the furnace openings $h^2$ are provided, and in the construction shown these openings are in a separate plate $h^3$, secured on the inside of the conduit by a central bolt $h^4$, passing through the front plate $b$, or by lugs $h^5$ on either side, fitting into suitable catches on the inside surface of the conduit $h$. The air to these apertures is controlled by valves $h^6$ of the butterfly type or any other suitable type or a sliding grid-valve on the plate $h^3$. The chamber $h'$ communicates at the said side with the box $u$ and above with the conduit $h$ by the openings, as shown.

Referring now to the coking-plate $i$, according to this invention this is so formed that the equalization of the rate of the forward feeding of fuel in mechanical coking-stokers at every point across the whole of the furnace is accomplished. This plate $i$ is shown in detail in Figs. 13, 14, and 15, and its chief characteristics consist in making it longest at the center and decreasing in length toward each side, being shortest at the furnace side. The result is that the edge of the coking-plate and the natural lower edge of the pile of fuel on it as it distributes itself on being pushed into the furnace by the plunger or feeder are practically coincident, and therefore the rate of supply of fuel from the pile at the point of take-off of fuel by the bars will be substantially equal to the whole width of the plate and furnace. The forward edge of the plate $i$ from the center to the sides may be curved, serrated, or rectilinear. In Figs. 13 and 14 it is shown slightly curved. The inward point portion $i'$ of the plate $i$ projects forward opposite the doorway $o$ and is provided at its leading or front edge with a flap $i^2$, hinged at the corners of the back edge in the plate $i$ at $i^3$. When the door $p$ is closed, the front edge of the flap-valve $i^2$ is raised by a projection $p^6$ on the lower edge of $p$, the incline coming in contact with the under side of $i^2$ in closing the door. This flap-valve is opened and provides a free opening for air under pressure from the box $u$ to the space under the shield $p'$. When the door $p$ is opened, $p^6$ leaves the flap $i^2$ and it closes and only a small quantity of air passes up from $u$ to the comparatively small grids in this valve. In the plate $i$ shown in Fig. 13 no flap-valve is provided and all the air passes up through the larger openings in the part $i'$ under the shield $p'$.

On either side of the doorway $o$, through which the fuel enters the furnace, the detachable and renewable plates $d$ for protecting the main frame $b$ are provided. The lower edge of these plates is in about the same horizontal plane with the lid of the box $u$ and the lower edge of $b$, and their inside edges next the opening $o$ are carried up vertically, while on the outside they are circular to correspond with the sides of the circular furnace. These plates are disposed some distance away from the frame-plates $b$ and are kept in position in relation to $b$ by the distance-blocks $d'$ or other similar means. They are also kept in position and drawn up toward $b$ by stud-bolts or the like. Inside these plates—that is, on the side next the fire at the outer edge—a rib or flange $d^2$ is provided as a means of stiffening them. The main function of these plates is to protect the more important and expensive frame-plate $b$ and prevent it from becoming burned and destroyed by the fuel being coked and the heat of the furnace and erosive action of the flames, and when in themselves they become burned and damaged by simply removing the damaged ones and introducing new ones, which can be very easily and quickly done, the main frame-plate $b$ will remain intact and serviceable for the whole life of the apparatus. Through these plates air is supplied to the fuel on the coking-plate $i$ at each side by means of the air-supply devices $e$, which convey air from the box $u$ to the pile of fuel on $i$ and resting up against the plates $d$.

In one form, as shown in Figs. 5 to 8, the devices $e$ consist of boxes or conduits fitting on the cover $u^{11}$ of the box $u$ and upon the face of the plate $b$, they being open at the bottom above the holes $n^{10}$ and provided with slots or vertical openings $e'$ at the back. The plate $b$ is provided with openings where these devices $e$ fit upon them, and the air-supply devices are provided with extensions $e^2$ in the form of short trunks, which pass through the plate $b$, while similar short trunks with openings $d^4$ in them corresponding with the openings $e'$ are formed on the inside of the plates $d$, and these plates and the devices $e$ are secured together and pulled onto the opposite sides of the plate $d$ by a central bolt or screw-stud $e^3$, while the bottom flange of the devices $e$ is secured by bolts or studs onto the cover $u^{11}$. The air under pressure from the box $u$ passes by way of the openings $u^{10}$ and the passages $e^2 e^4$ through the pile of fuel in front of them, resting on the coking-plate $i$, and assists in the combustion of fuel on the coking-plate and the coking of such fuel.

In the air-supply device $e$ (shown in Figs. 5 and 6) the front of the box is provided with a hinged door $e^4$, whereby access to the air-openings $e'$ and also the fuel beyond them on the inside of the plate $d$ is had, and the fastening-bolts $e^3$ can be attended to.

In the modified devices shown in Figs. 7 and 8 the air devices $e$ are without doors, and they are drawn up to the plates $b$ by a stud-bolt and nut $e^3$, secured in the plate $d$ and passing through $e$. The air-trunks $d^4$ on the plates $d$ rest up against the inside of $b$ and the air passes from the box $u$ through the plate $d$ similarly as in the former case.

In the modification of the side air-supply device shown in Figs. 9 and 10 in sectional plan and front elevation the plate $d$ is provided internally with a continuous flange $d^{4\times}$ and with slots or openings $d^4$ within this flange, while the air device $e$ simply conducts air from the chamber $u$ throughout the openings in the plate $b$ into the space within $d^{4\times}$, from which it is distributed through the fuel in front of the plate by the gridded openings $d^4$. The fire-bars $c$ are worked to and fro by cams on the shaft $t$ in any suitable way, and the shaft $t$ is revolved by suitable driving mechanism. The shaft $t$ is made in two lengths for the two furnaces and is supported in three bearings, one bearing $s$ at each end and a central bearing $s'$ in the middle. The shaft represents a polysided figure in cross-section, and where it passes through the bearings it is provided with externally-cylindrical sleeves. The central bearing supports the two adjacent ends of the two shafts $t$, and these two shafts are coupled together. The sleeve $s^2$ at this central bearing performs two functions—viz., it acts as a journal for revolving in the bearing $s^2$ and also as a coupling. At one end it is provided with a flange $s^3$ and through this part it is fastened to the end of one of the shafts $t$ by a pin $s^4$, and so the coupling is connected to the shaft, while at the other end a loose collar $s^5$ is provided on the end of $s^2$, and both it, the sleeve $s^2$, and the end of the other shaft $t$ are all secured together by a pin $s^6$. By this means this single bearing $s'$ serves to support both shafts at the meeting ends. The sleeves $s^7$ at the end bearing are similar in construction and function to that just described, except that of the service as a coupling. The bearings $s\ s'$ are adjustable vertically on and fixed upon the horns $b^3$ of the plates $b$, the adjustment being effected by the screw-studs $s^8$.

In this mechanical stoking-furnace the clinker and residue are delivered from the moving fire-bars over the end of the grate and beyond a plate closing the ash-pit end, and they are removed from the point through a doorway, which is normally closed by a door, in this plate. This door and its doorway and plate are shown in Figs. 16 and 17. In these figures $f$ is the plate, fitting in and filling the end of the ash-pit below the fire-bars at the rear end, $f'$ is the doorway therein, the face of which is inclined, as shown, and $g$ is the door, fitting over and normally resting on the face of this doorway and supported by hinge-pins $g'$ at the upper corners, these pins being supported in bosses $f^2$ on the plate $f$ and outer bosses $g^2$ on the upper corners of the door $g$. These door-bosses serve as pulleys, operated by chains $g^3$, which pass over them and are fastened to them by studs $g^4$, and the chains $g^3$ also pass under projecting parts $g^5$ on the lower edges of the door. By thus arranging and mounting the chains $g^3$ for operating the doors and passing them under the lower edges of same the doors are readily and more easily operated.

A modified form of door-operating means is shown in Fig. 18 in the closed and open positions, in which the hinge of the door is provided with a lever $g^6$, operated by a chain $g^3$, the lever $g^6$ being so arranged that when the door $g$ is open considerable leverage is offered by the lever $g^6$, as shown.

Referring now to Figs. 19, 20, and 21, there is shown in these figures a special construction and arrangement of stationary bars or plates used at the sides of the furnaces employing mechanical stokers with moving fire-bars, the stationary bars or plates being employed to fill up the space between the outermost moving bars and the sides of the furnace. This construction consists, in the first place, of fixed bars $k$, which are of full length of the grate, the ends of which are held at the front and back of the furnace. These bars are arranged one on either side of the moving fire-bars, which work up along the plain side of these bars $k$. Between these bars $k$ and the side of the furnace-plate are making-up bars, which are supported by brackets $k'$ on the outer sides of $k$. These making-up bars $k$ comprise bars $l$, next the bars $k$, having upon them, at one side, a number of projecting tongues $l'$ and projections $l^2$ on their under sides, the vertical faces of which abut up against the inside surfaces of $k'$, and so hold the bars $l$ in position longitudinally. Then inside the bars $l$ and coming next the furnace side are third bars $m$, which on the side next $l$ have slots in them to receive the tongues $l^2$, and these bars $m$ are partly supported by these tongues and partly by the brackets $k'$ and the side of the furnace which they abut on. In the outer edge of each of the bars $m$ there is a longitudinal slot, which takes a filling-up piece $n$, these pieces being adapted to fill the triangular spaces existing in furnaces which are made up of several cylindrical parts the ends of which are flanged outwardly and riveted together. At these joints the triangular grooves around the inside of the furnace are formed. These devices $n$ can be slid along the slot $m'$ in $m$ to adjust them in the position of these grooves or recesses. When the bars $l$ and $m$ have been fitted in position, the spaces between them can be plugged by suitable plugs to keep them at this distance apart.

The general improvements under this invention have been described as applied chiefly in combination in a mechanical stoking apparatus in which forced draft is employed and in which the stoking parts proper are of the coking type, and they have also been described as used mainly in connection with cylindrical furnaces, such as are ordinarily used in Lancashire, Cornish, Scotch, and analogous kinds of steam-generators; but it is to be understood that while they are advantageously serviceable in combination, yet separately they, or some of them, are capable of being used with advantage either by themselves or in combination in mechanical stokers of other or different types and employing other modes for supplying the air for the combustion of fuel and also in connection with other kinds of furnaces, and when employed in connection with furnaces which differ in form from those referred to the parts, or some of them, will be modified or supplied in different modified manners to suit the varying conditions of application, and it is to be stated that generally in the carrying out or application of the invention the various parts will necessarily be modified as to form or construction to meet various requirements or special cases.

What is claimed in respect of the herein-described invention is—

1. A mechanical stoker for furnaces, comprising in combination, a fuel-feeding device at the upper part of the furnace, adapted to supply the fuel onto the front end of the grate; a grate having moving bars operated from the front of the furnace; a box on, and projecting in front of the furnace-front, inclosing the front of the ash-pit below the fire-bars, and the ends of the fire-bars; and air-blowing means connected with the said box, by which air is introduced into the box and ash-pit, and maintained therein at a pressure above that of the atmosphere; substantially as set forth.

2. A mechanical stoker for furnaces, comprising in combination, a grate having longitudinally-movable grate-bars; a fuel-supply device for feeding fuel onto the front end of said grate; a box inclosing the front end of, and communicating directly with the ash-pit, and also inclosing the ends of said fire-bars, disposed upon the furnace directly in front of said ash-pit; and a shaft passing laterally through said box, with operating means thereon for actuating the fire-bars within the box; and means connected with said box for forcing air into it; substantially as set forth.

3. In a mechanical stoker for furnaces, in which the fuel is coked at the front end, a fuel-feeding device at the upper part of the furnace-front, adapted to feed fuel onto the front end of the furnace; a box below, inclosing the mouth of the ash-pit, and to which air is supplied under pressure; and conduits connecting this box, with the front of the furnace above it, by which some of the air supplied to said box is delivered into the pile of fuel at the front of the furnace, whereby the fuel at this part is rapidly coked, and its combustion assisted; substantially as set forth.

4. In a mechanical stoker for furnaces, a device for feeding the fuel into the furnace, above the bars at the upper part of the front of the apparatus, a box in front of the furnace inclosing the front of the ash-pit, and communicating directly therewith; and inverted steam-jet blowers $w$, directly connected with the under side of said box, by which air under pressure above that of the atmosphere is supplied to said box, and the ash-pit; substantially as described.

5. In a mechanical stoker for furnaces, a device for feeding the fuel into the furnace above the bars at the upper part of the apparatus; a box in front of the furnace inclosing the front of the ash-pit, and communicating directly therewith; and steam-jet blowers $w$, directly connected with the under side of said box, by which air under pressure above that of the atmosphere is supplied to said box and the ash-pit; the said blowers being inverted with their bases connected to the bottom of the box, and their heads and steam-nozzles inclosed in a chamber below; substantially as set forth.

6. In a mechanical stoker for furnaces worked under forced draft, a box fixed upon the front of the furnace, connecting with, and in front of the ash-pit; air-blowing means connected with said box for supplying air under pressure greater than that of the atmosphere; a fuel-feeding device on the furnace-front, by which fuel is fed to the furnace above the grate; a closed or air-tight hopper for containing the fuel, having a close-fitting lid or cover; and a conduit connecting the hopper at a point above the fuel, with a part in which air under pressure, supplied by air-forcing means exists, whereby air under pressure is maintained in the hopper above the fuel; for the purposes specified.

7. In a mechanical stoker for furnaces, the fuel-feeding device on the front and upper part of the furnace, adapted to supply fuel onto the grate; a box in front of the furnace, inclosing the front of, and communicating with the ash-pit; air-forcing means connected with said box, for delivering air to it and the ash-pit, at a pressure above that of the atmosphere; a grate having moving bars; and a plate or frame at the rear end of the grate, inclosing the ash-pit at this end, having a doorway with an inclined face, inclined forward from the top, and a door, hinged at its upper part, resting normally thereon, and an operating connection between the door and the box, connected with and operated upon the axle of the door; substantially as set forth.

8. In a mechanical stoker for furnaces, the combination with the front of the furnace, of the air-box $u$, connected with the furnace-front, and communicating directly with the ash-pit, a shaft $t$ operating the grate-bars, extending through said box; a detachable cover $u'$ at the upper part of the box; and filling-pieces $t^2$ fitting in gaps in the sides of the box above the shaft $t$; substantially as set forth.

9. In a mechanical stoker for furnaces, the combination with the front of the furnace of the box $u$, connected with the furnace-front, and communicating directly with the ash-pit, a shaft $t$ operating the grate-bars, extending through said box; and inverted steam-jet air-blowers, the discharge ends of the bodies of which are secured onto the bottom of the box $w$; substantially as set forth.

10. In a mechanical stoker for furnaces, the combination with the front of the furnace, of the air-box $u$, connected with the furnace-front, and communicating directly with the ash-pit, and a shaft $t$ for operating the grate-bars, extending through said box; the inverted steam-jet blowers $w$, having the mouths of their bodies secured to the under side of the box $u$; and the flap $u^7$ in the interior of $u$, adapted to fold up or lie down over said blower-mouths; substantially as set forth.

11. In a mechanical stoker for steam-generator furnaces, in which air under pressure above that of the atmosphere is supplied to the ash-pit; the box $u$ inclosing the ash-pit on the front of the furnace, in combination with steam-jet blowers directly connected therewith, and supplying air thereto, and having the angular plate $u^9$ on the bottom of the box, and fitting over the edge of the plate against which the lower part of the box fits.

12. In mechanical stokers for furnaces, the box $u$ and shaft $t$, filling-strip $t^2$ fitting in gaps in the side of the box, a cover $u'$, flanges $t^5$ on $t^2$, and bridge-bar $t^7$, and fastening-bolt $t^6$; substantially as set forth.

13. In a mechanical stoker for furnaces, the combination of a front furnace-plate $b$, inclosing the front of the furnace; internal detachable shield-plates $d$, and a feeding device on the upper part of the plate $b$, through which the fuel is supplied to the furnace; substantially as set forth.

14. In a mechanical stoker of the coking type for furnaces, the combination of a front furnace-plate $b$ inclosing the front of the furnace; a fuel-feeding device $e$ on the upper part and center of said plate; internal detachable side shield-plates $d$ secured on the inside of $b$; a box $u$ on the lower part of the furnace, and closing, and communicating directly with the ash-pit; conduits $e$ making communication between the upper part of the box $u$ and the furnace-front, and plates $d$, through which air is supplied from the box $u$ to the fuel being coked on the inside of the side plates $d$; substantially as set forth.

15. In a mechanical coking-stoker, the combination of front furnace-plate $b$, a box $u$ at the lower part of the furnace, inclosing and communicating with the ash-pit; a feeding device $e$ above the box $u$, and air-supply conduits $h$, communicating with the sides of the box $u$, and carried up through the plate $b$ above $e$, and having openings on the inside at the top, through which air is supplied to the furnace above the fuel; substantially as set forth.

16. In a mechanical stoker for furnaces, the combination with the front of the furnace, of the front plate $b$ covering the upper part of the furnace; the box $u$ connected with said front, and communicating directly with the ash-pit; a lid $u'$ on the top of said box; a doorway-opening $o$ in the lower part of said plate $b$, open at the lower side; an upwardly-projecting ledge $u''$ on the lid $u'$, fitting in the open part of the bottom of $o$; and inclosing said opening; and a door $p$ fitting over the opening $o$ and making joint with the edges of the plate, and the edge of the rib $u''$, forming this opening; substantially as set forth.

17. In a mechanical stoker of the coking type for furnaces, the combination with the front plate $b$, of hollow box-door $p$ hinged on $b$, and provided internally with a protruding perforate plate $p^7$, projecting through the plate $b$, and into the furnace, and into the space within said plate, air is admitted from below, through an opening; substantially as set forth.

18. In a mechanical stoker for furnaces, of the coking type, the combination with the front plate $b$ of a fuel-feeding device on said plate at the upper part; a coking-plate $i$ below, onto which the fuel is fed; a perforate inwardly-protruding plate $p'$, directly above the front end of $i$; a valve $i^2$ under the open lower end of $p'$; and a fire-door $p$ adapted, when closed, to open the valve $i^2$ when the door $p$ is shut, and to admit air into the space behind the plate $p'$; substantially as set forth.

19. In a mechanical stoker of the coking type for furnaces, the combination with the front furnace-plate $b$, of the fuel-feeding device at the upper part of same; the coking-plate $i$, having a hinged valve $i^2$ in the front end of same; the fire-door $p$ with the inwardly-projecting perforate plate $p'$ upon it, open below directly above the valve $i^2$, and an inclined projecting part $p^6$ on the door $p$, adapted to act on the valve $i^2$ when the door is closed, and to raise and open it, and to admit air from below into the space behind and within the plate $p'$; substantially as set forth.

20. In a mechanical stoker of the coking type, for furnaces, the combination of a grate having moving fire-bars; a fuel-feeding device at the front of the furnace and above the grate, and of less width than the grate; and a plate on the grate at the front end, and below the fuel-feeder extending farther along the grate at the center, than at the sides, whereby an equal distribution of fuel onto the grate, laterally, is effected.

21. In a mechanical stoker of the coking type, the combination of a furnace-front plate $b$; a fuel-feeding device at the upper part of same, of substantially less width than the width of grate, at the upper part of same; a grate with moving bars; a perforate coking plate $i$, under the fuel-feeding device, onto which the fuel falls, discharged from the fuel-feeder, being relatively long in the center, and narrow toward the edges of the furnace; substantially as set forth.

22. In a mechanical stoker of the coking type for furnaces, the combination of front furnace-plate $b$; air-supply box $u$, inclosing the front of the ash-pit; air-supply device $e$ comprising a box having an opening below, and sitting on the top of the box $u$, and its face resting on the plate $b$, with apertures $e'$ in the back of same; and the plate $d$ fitting up against the plate $b$ and having apertures $d^4$, whereby the air from the box $u$ is conducted into the interior of $e$, and passes therefrom through the slots or conduits $e^2$, $d^4$, into the fuel being coked against the plate $d$; substantially as set forth.

23. In a mechanical stoker for furnaces, the combination of a front plate $b$, and a feeding device on the outside of said plate, and secured and supported thereon by wedge-lugs $e^2$, and catches $e^3$ on either side; substantially as set forth.

24. In a mechanical stoker for duplex furnaces, having movable bars operated on a transverse shaft across the front of the furnace, the combination of duplex prismatic shafts $t$ $t'$, having at their outer ends sleeves fitting over the outer ends of said shafts, and being externally cylindrical outside; bearings $s$ in which said sleeves revolve; a central sleeve $s^2$ fitting over the adjacent ends of the shaft $t$, and secured by a diagonal pin at one end to one shaft, and having a loose collar at the other end, and a pin passing through said collar, sleeve, and the end of the other shaft, the sleeve being cylindrical externally, and serving both as a coupling and journal for said shaft; and a single central bearing $s'$ in which said sleeve $s^2$ revolves; substantially as set forth.

25. In a mechanical stoker for furnaces, having longitudinally-moving grate-bars, the combination at the sides of the furnace, of side fixed bars $k$; internal bars $l$ supported by $k$, and having projections $l'$; and bars $m$ with slots in them, in which the projecting parts $l'$ work, and fitting up against the sides of the furnace; substantially as set forth.

26. In a mechanical stoker for furnaces, having longitudinally-moving grate-bars, the combination at the sides of the furnace, of side fixed bars $k$; with supporting parts $k'$ at their outer side; bars $l$ next the bars $k$, having the tongues $l'$, and supported from the parts $k'$; the bars $m$ with lateral slots through them, in which the tongues $a$ fit and work; in a longitudinal groove on their outer edges; and filling-pieces $n$ fitting in and supported by the slots $m'$; substantially as set forth.

In witness whereof we have hereunto set our hands in presence of two witnesses.

JAMES JONES MELDRUM.
  THOMAS FREDERICK MELDRUM.
  JOHN WESLEY MELDRUM.
  FRED CLAYTON.

Witnesses:
 THOMAS COLLINGE,
 W. W. MANFIELD.